US012586869B2

(12) United States Patent
Liu et al.

(10) Patent No.: US 12,586,869 B2
(45) Date of Patent: Mar. 24, 2026

(54) SEPARATOR, BATTERY CELL, BATTERY, AND ELECTRIC DEVICE

(71) Applicant: CONTEMPORARY AMPEREX TECHNOLOGY CO., LIMITED, Ningde (CN)

(72) Inventors: Feng Liu, Ningde (CN); Yulei Fan, Ningde (CN); Wenhao Guan, Ningde (CN); Wei Zhong, Ningde (CN); Xiaoming Ge, Ningde (CN); Chuying Ouyang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/297,579

(22) Filed: Aug. 12, 2025

(65) Prior Publication Data

US 2025/0372817 A1      Dec. 4, 2025

Related U.S. Application Data

(63) Continuation of application No. PCT/CN2023/137971, filed on Dec. 11, 2023.

(30) Foreign Application Priority Data

Sep. 28, 2023      (CN) .......................... 202311276950.2

(51) Int. Cl.
H01M 50/446          (2021.01)
H01M 50/417          (2021.01)
(Continued)

(52) U.S. Cl.
CPC ....... H01M 50/446 (2021.01); H01M 50/417 (2021.01); H01M 50/423 (2021.01); H01M 50/491 (2021.01); *H01M 2220/20* (2013.01)

(58) Field of Classification Search
CPC . H01M 50/417; H01M 50/446; H01M 50/491
See application file for complete search history.

(56) References Cited

U.S. PATENT DOCUMENTS

2017/0062785 A1* 3/2017 Shi ........................ B32B 27/308
2024/0039052 A1* 2/2024 Nishida ............... H01M 50/531

FOREIGN PATENT DOCUMENTS

CN          113097648 B      10/2021
CN          115207560 A      10/2022
(Continued)

OTHER PUBLICATIONS

Machine translation of CN115911757A (Year: 2023).*
(Continued)

*Primary Examiner* — Jonathan G Jelsma
(74) *Attorney, Agent, or Firm* — K&L Gates LLP

(57)          ABSTRACT

A separator, a battery cell, a battery, and an electric device are described. The separator comprises a porous base material and a ferroelectric coating located on at least one surface of the porous base material. The ferroelectric coating comprises a ferroelectric material. The ferroelectric material comprises an inorganic ferroelectric and a ferroelectric polymer. The ferroelectric polymer comprises polyvinylidene fluoride and a copolymer thereof, the ferroelectric polymer comprises $\beta$-phase polyvinylidene fluoride, and the content of the $\beta$-phase polyvinylidene fluoride in the ferroelectric polymer is greater than or equal to 60%. The separator can slow the continuous growth of dendrites in a direction perpendicular to an electrode sheet, reduce internal short circuits of the battery and improve the reliability of the battery, and can further improve the coulombic efficiency and rate performance of the battery.

20 Claims, 3 Drawing Sheets

10

(51) Int. Cl.
    *H01M 50/423*      (2021.01)
    *H01M 50/491*      (2021.01)

(56)          References Cited

FOREIGN PATENT DOCUMENTS

| | | | |
|---|---|---|---|
| CN | 115458711 A | 12/2022 |
| CN | 115911750 A | 4/2023 |
| CN | 115911757 A | 4/2023 |
| CN | 116355147 A | 6/2023 |
| CN | 116706426 A | 9/2023 |

OTHER PUBLICATIONS

ISR for PCT/CN2023/137971 mailed Jun. 11, 2024.
Written Opinion or PCT/CN2023/137971 mailed mailed Jun. 11, 2024.

* cited by examiner

5

5

10

102
101
103

1 μm

SEPARATOR, BATTERY CELL, BATTERY, AND ELECTRIC DEVICE

CROSS-REFERENCE TO RELATED APPLICATION

This application is a continuation of International application PCT/CN2023/137971 filed on Dec. 11, 2023 that claims priority to Chinese Patent Application No. 202311276950.2 filed on Sep. 28, 2023. The content of these applications is incorporated herein by reference in its entirety.

TECHNICAL FIELD

The present application relates to a separator, a battery cell, a battery, and an electric device.

BACKGROUND

In recent years, batteries have been widely used in energy storage power systems such as hydropower, thermal power, wind power, and solar power stations, as well as in various fields such as consumer electronics, electric tools, electric bicycles, electric motorcycles, electric vehicles, military equipment, and aerospace. With the application and promotion of batteries, their reliability has received more and more attention. During the charging and discharging of batteries, the dendrites on the negative electrode are one of the important reasons affecting the reliability and service life of batteries. How to slow down the growth of dendrites without affecting the performance of the battery is a technical problem that needs to be solved urgently. The above statements are only used to provide background information related to the present application and do not necessarily constitute the prior art.

SUMMARY

The present application provides a separator, a battery cell, a battery, and an electric device. The separator can slow down the continuous growth of dendrites in a direction perpendicular to an electrode plate, reduce internal short circuits of the battery, improve the reliability of the battery, and improve the coulombic efficiency and the rate capability of the battery.

A first aspect of the present application provides a separator, which includes a porous substrate and a ferroelectric coating located on at least one surface of the porous substrate. The ferroelectric coating includes a ferroelectric material, and the ferroelectric material includes an inorganic ferroelectric and a ferroelectric polymer, where the ferroelectric polymer includes polyvinylidene fluoride and a copolymer thereof, the ferroelectric polymer includes β-phase polyvinylidene fluoride, and the content of the β-phase polyvinylidene fluoride in the ferroelectric polymer is greater than or equal to 60%.

The ferroelectric polymer provided in the embodiments of the present application not only can serve as a binder, but also can have a high dielectric constant εr and thereby enable the slowdown of continuous growth of dendrites in the direction perpendicular to the electrode plate and the reduction of internal short circuits of the battery. When applied to the battery, the ferroelectric polymer can improve the reliability, the coulombic efficiency, and the rate capability of the battery.

In any embodiment, the content of β-phase polyvinylidene fluoride in the ferroelectric polymer is greater than or equal to 80%, optionally greater than or equal to 90%.

As such, the continuous growth of dendrites in the direction perpendicular to the electrode plate can be further slowed down, the internal short circuits of the battery are reduced, and the coulombic efficiency and rate capability of the battery can be improved.

In any embodiment, the dielectric constant $\varepsilon_r$ of the ferroelectric coating is greater than the dielectric constant $\varepsilon_r$ of the inorganic ferroelectric, and optionally, the ratio of the dielectric constant $\varepsilon_r$ of the ferroelectric coating to the dielectric constant $\varepsilon_r$ of the inorganic ferroelectric is greater than or equal to 1.6, more optionally greater than or equal to 2.0.

As such, the continuous growth of dendrites in the direction perpendicular to the electrode plate can be further slowed down, the internal short circuits of the battery are reduced, and the coulombic efficiency and rate capability of the battery can be improved.

In any embodiment, the dielectric constant $\varepsilon_r$ of the inorganic ferroelectric is greater than the dielectric constant $\varepsilon_r$ of the ferroelectric polymer.

In any embodiment, the dielectric constant $\varepsilon_r$ of the inorganic ferroelectric is 200-8000, optionally 2000-6000.

In any embodiment, the dielectric constant $\varepsilon_r$ of the ferroelectric polymer is 5-100, optionally 8-70.

In any embodiment, at least a part of the ferroelectric polymer is located on at least a part of the surface of the inorganic ferroelectric.

When the ferroelectric polymer is located on at least a part of the surface of the inorganic ferroelectric, the probability of ferroelectricity loss of the ferroelectric coating due to the ferroelectric-paraelectric transition of the inorganic ferroelectric in the preparation of the separator can be further reduced, thereby enabling more effective slowdown of continuous growth of dendrites in the direction perpendicular to the electrode plate, and additionally, the improvement of the coulombic efficiency of the battery can be facilitated. The ferroelectric polymer being located on at least a part of the surface of the inorganic ferroelectric can further enable the dielectric constant $\varepsilon_r$ of the ferroelectric coating to be greater than both the dielectric constant $\varepsilon_r$ of the inorganic ferroelectric and the dielectric constant $\varepsilon_r$ of the ferroelectric polymer.

In any embodiment, the weight content of the inorganic ferroelectric in the ferroelectric material is 80%-99%, optionally 85%-95%.

In any embodiment, the weight content of the ferroelectric polymer in the ferroelectric material is 1%-20%, optionally 5%-15%.

By adjusting the weight content of the inorganic ferroelectric and the ferroelectric polymer in the ferroelectric material within the above range, the dielectric constant $\varepsilon_r$ of the ferroelectric coating can be increased, such that the dielectric constant $\varepsilon_r$ of the ferroelectric coating is greater than both the dielectric constant $\varepsilon_r$ of the inorganic ferroelectric and the dielectric constant $\varepsilon_r$ of the ferroelectric polymer, thereby enabling more effective slowdown of continuous growth of dendrites in the direction perpendicular to the electrode plate, reducing internal short circuits of the battery, improving the reliability and coulombic efficiency of the battery, and additionally, increasing the adhesion between the ferroelectric coating and the pores.

In any embodiment, the Curie temperature of the ferroelectric polymer is 150° C. to 250° C., optionally 160° C. to 200° C.

In any embodiment, the remanent polarization of the ferroelectric polymer is 10 mC/m² to 1000 mC/m², optionally 20 mC/m² to 800 mC/m².

In any embodiment, the weight-average molecular weight of the ferroelectric polymer is 200,000 to 800,000, optionally 400,000 to 650,000.

The weight-average molecular weight of the ferroelectric polymer being within the above range enables a suitable crystallinity, a suitable Curie temperature, and a high dielectric constant $\varepsilon_r$ of the ferroelectric polymer, and also enables a suitable viscosity of the ferroelectric polymer.

In any embodiment, the melting temperature of the ferroelectric polymer is 140° C. to 220° C., optionally 143° C. to 200° C.

The melting point of the ferroelectric polymer being within the above range enables a suitable crystallinity, a suitable Curie temperature, and a high dielectric constant $\varepsilon_r$ of the ferroelectric polymer, and also enables a suitable viscosity of the ferroelectric polymer.

In any embodiment, the crystallinity of the ferroelectric polymer is greater than or equal to 45%, optionally 45%-68%. The crystallinity of the ferroelectric polymer being within the above range can reduce the thermal shrinkage of the separator and improve the mechanical strength of the separator.

In any embodiment, the Curie temperature of the inorganic ferroelectric is 110° C. to 150° C., optionally 120° C. to 140° C.

In any embodiment, the ferroelectric polymer includes one or more of polyvinylidene fluoride and copolymers of a vinylidene fluoride monomer with other monomers.

Optionally, the other monomers include one or more of trifluoroethylene, chlorotrifluoroethylene, fluorinated acetylene, and hexafluoropropylene.

Optionally, the copolymers of the vinylidene fluoride monomer with other monomers include one or more of a vinylidene fluoride-trifluoroethylene copolymer, a vinylidene fluoride-trifluoroethylene-chlorotrifluoroethylene copolymer, a vinylidene fluoride-trifluoroethylene-chlorotrifluoroethylene-fluorinated acetylene copolymer, and a vinylidene fluoride-hexafluoropropylene copolymer.

In any embodiment, the inorganic ferroelectric includes one or more of a perovskite type, a tungsten bronze type, a bismuth layer type, a pyrochlore type, a niobate type, and lead barium lithium niobate.

In any embodiment, the volume distribution particle size Dv50 of the inorganic ferroelectric is 0.05 μm to 5 μm, optionally 0.1 μm to 1 μm.

The volume distribution particle size Dv50 of the inorganic ferroelectric being within the above range enables a suitable viscosity of the ferroelectric coating slurry to facilitate the coating and can improve the uniformity and consistency of the ferroelectric coating. Additionally, this is also conducive to increasing the adhesion between the ferroelectric coating and the pores and reducing powder falling. Furthermore, the problem of pore blocking can also be reduced, and the breathability and ion transfer characteristics of the separator are improved.

In any embodiment, the volume distribution particle size Dv50 of the ferroelectric polymer is 10 nm to 150 nm, optionally 15 nm to 50 nm.

In any embodiment, the thickness of the ferroelectric coating is 1 μm to 3.5 μm, optionally 1.5 μm to 3 μm. As such, the battery can have high reliability, high coulombic efficiency, and good rate capability.

In any embodiment, the areal density of the ferroelectric coating is 2.5 g/m² to 15 g/m², optionally 3 g/m² to 12 g/m².

As such, the battery can have high reliability, high coulombic efficiency, and good rate capability.

In any embodiment, the ferroelectric coating further includes a dispersant and/or a thickener.

In any embodiment, the dispersant includes one or more of hydrolyzed polymaleic anhydride, polyacrylic acid, an acrylic block copolymer, a polyester block copolymer, a polyethylene glycol polyol, polyethyleneimine, and respective derivatives thereof.

In any embodiment, the ratio of the total weight of the ferroelectric material to the weight of the dispersant is 1:(0.01-0.02), optionally 1:(0.010-0.015).

An appropriate amount of the dispersant can ensure uniform dispersion of the ferroelectric coating slurry to facilitate the coating, and also enable improved weight of the ferroelectric coating.

In any embodiment, the thickener includes one or more of sodium hydroxymethylcellulose, methyl cellulose, hydroxyethyl cellulose, hydroxypropyl methyl cellulose, polyacrylate, polyurethane, and polyether.

In any embodiment, the ratio of the total weight of the ferroelectric material to the weight of the thickener is 1:(0.01-0.02), optionally 1:(0.010-0.015).

An appropriate amount of the thickener can improve the stability of the ferroelectric coating slurry to facilitate the coating, and also enable improved weight of the ferroelectric coating.

In any embodiment, the ferroelectric coating is located on one of the surfaces of the porous substrate, and a ceramic coating is disposed on the other surface of the porous substrate; when applied to a battery, the ferroelectric coating faces a negative electrode and the ceramic coating faces a positive electrode.

In any embodiment, the thickness of the porous substrate is 4 μm to 15 μm, optionally 5 μm to 10 μm.

In any embodiment, the porous substrate includes one or more of polyolefin, halogenated polyolefin, polyamide, polyester, and respective derivatives thereof.

A second aspect of the present application provides a battery cell, which includes the separator according to the first aspect of the present application.

A third aspect of the present application provides a battery, which includes the battery cell according to the third aspect of the present application.

A fourth aspect of the present application provides an electric device, which includes the battery according to the third aspect of the present application.

The electric device of the present application includes the battery provided by the present application and thus has at least the same advantages as the battery.

BRIEF DESCRIPTION OF THE DRAWINGS

In order to more clearly illustrate the technical solutions of the embodiments of the present application, the drawings required to be used in the embodiments of the present application are briefly described below. Apparently, the drawings in the following description illustrate merely some embodiments of the present application, and those of ordinary skills in the art may still derive other drawings from these drawings without creative efforts.

Figure 1:
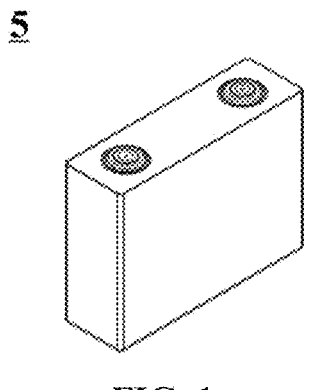
FIG. 1 is a schematic diagram of a battery cell according to some embodiments of the present application.

The drawings are not necessarily drawn to scale. The reference numerals are as follows: 1 battery pack, 2 upper case body, 3 lower case body, 4 battery module, 5 battery cell, 51 housing, 52 electrode assembly, 53 cover plate, 10 separator, 101 porous substrate, 102 ferroelectric coating, 103 second coating.

DETAILED DESCRIPTION

Hereinafter, embodiments of the separator, the battery cell, the battery, and the electric device of the present application are specifically disclosed in detail with appropriate reference to the drawings. However, unnecessarily detailed descriptions may be omitted. For example, detailed descriptions of well-known matters and repetitive descriptions of actually identical structures may be omitted. This is to avoid unnecessary lengthiness of the following descriptions and to facilitate understanding by those skilled in the art. Additionally, the drawings and the following descriptions are provided to enable those skilled in the art to fully understand the present application and are not intended to limit the subject matter recited in the claims.

The "ranges" disclosed in the present application are defined with lower and upper limits. A given range is defined by selecting a lower limit and an upper limit that delineate the boundaries of a particular range. Ranges defined in this manner may include or exclude the end values and can be combined arbitrarily, which means that any lower limit may be combined with any upper limit to form a range. For example, if ranges of 60-120 and 80-110 are listed for a particular parameter, it is understood that ranges of 60-110 and 80-120 are also anticipated. Additionally, if the minimum range values listed are 1 and 2, and the maximum range values listed are 3, 4, and 5, then the following ranges can all be anticipated: 1-3, 1-4, 1-5, 2-3, 2-4, and 2-5. In the present application, unless otherwise specified, the numerical range "a-b" indicates an abbreviated representation of any combination of real numbers between a and b, where both a and b are real numbers. For example, the numerical range "0-5" indicates that all real numbers between "0-5" are listed herein, and "0-5" is merely an abbreviated representation of a combination of these numerical values. Additionally, when stating that a parameter is an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application can be combined with one another to form new technical solutions, and such technical solutions should be deemed to be included in the disclosure of the present application.

Unless otherwise specified, all technical features and optional technical features of the present application can be combined with one another to form new technical solutions, and such technical solutions should be deemed to be included in the disclosure of the present application.

Unless otherwise specified, all steps of the present application can be performed sequentially or randomly, preferably sequentially. For example, if the method includes steps (a) and (b), it indicates that the method may include steps (a) and (b) performed sequentially or steps (b) and (a) performed sequentially. For example, if the mentioned method may further include step (c), it indicates that step (c) may be added to the method in any order; for example, the method may also include steps (a), (b), and (c), or steps (a), (c), and (b), steps (c), (a), and (b), or the like.

In the present application, the terms "a plurality of" and "multiple" mean two or more.

In the description of the embodiments of the present application, unless otherwise specified, a first feature being "on" or "under" a second feature may be that the first feature and the second feature are in direct contact or the first feature and the second feature are in indirect contact through an intermediate. Moreover, a first feature being "over", "above", and "on top of" a second feature may be that the first feature is right above or obliquely above the second feature, or simply mean that the first feature is at a higher horizontal level than the second feature. A first feature being "under", "below", and "beneath" a second feature may be that the first feature is right under or obliquely under the second feature, or may simply mean that the first feature is at a lower horizontal level than the second feature.

Unless otherwise specified, the terms used in the present application have well-known meanings that are commonly understood by those skilled in the art.

Unless otherwise specified, the values of the parameters mentioned in the present application can be measured by various test methods commonly used in the art. For example, they can be measured according to the test methods given in the examples of the present application. Unless otherwise specified, all parameters are tested at 25° C.

The Dv50 of materials has a meaning well known in the art and can be determined using instruments and methods known in the art. For example, the measurement may be conveniently performed with reference to GB/T 19077-2016 using a laser particle size analyzer (e.g., Malvern Mastersizer 3000). The physical definition of Dv50 is the particle size at which the cumulative volume distribution percentage of the material reaches 50%.

The battery mentioned in the embodiments of the present application refers to a single physical module that may include one or a plurality of battery cells to provide a higher voltage and capacity. For example, the battery mentioned in the present application may include a battery cell, a battery module, a battery pack, or the like.

A battery cell is the smallest unit forming a battery and can independently realize the functions of charging and discharging. The battery cell may be cylindrical, rectangular parallelepiped-shaped, or in other shapes, which is not limited in the embodiments of the present application. FIG. 1 shows a battery cell 5 having a rectangular parallelepiped structure as one example.

When there are a plurality of battery cells, the plurality of battery cells are connected in series, in parallel, or in series-parallel by a busbar component. In some embodiments, the battery may be a battery module, and when there are a plurality of battery cells, the plurality of battery cells are arranged and fixed to form one battery module. In some embodiments, the battery may be a battery pack. The battery pack includes a case and a battery cell, and the battery cell or the battery module is accommodated in the case. In some embodiments, the case may be a part of the chassis structure of the vehicle. For example, a part of the case may become at least a part of the bottom plate of the vehicle, or a part of the case may become at least a part of a crossmember and a longitudinal member of the vehicle.

In some embodiments, the battery may be an energy storage device. The energy storage device includes an energy storage container, an energy storage electric cabinet, and the like.

The battery cell generally includes an electrode assembly and an electrolyte. The electrode assembly may be a winding structure or a stacking structure, which is not limited in the embodiments of the present application.

The battery cell may also include an outer packaging, which may be configured for packaging the electrode assembly and electrolyte. The outer packaging may be a hard shell, such as a hard plastic shell, an aluminum shell, or a steel shell. The outer packaging may also be a soft pack, such as a pouch-type soft pack. The soft pack may be made of plastic, such as one or more of polypropylene (PP), polybutylene terephthalate (PBT), and polybutylene succinate (PBS).

Figure 2:
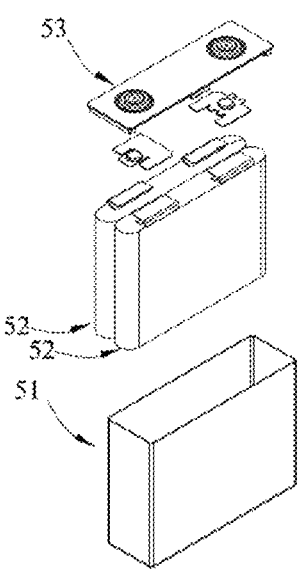
FIG. 2 is a schematic exploded view of a battery cell according to some embodiments of the present application.

In some embodiments, as shown in FIG. 2, the outer packaging may include a housing 51 and a cover plate 53. The housing 51 may include a bottom plate and side plates connected to the bottom plate, and the bottom plate and the side plates define, in an enclosing manner, an accommodating cavity. The housing 51 is provided with an opening communicating with the accommodating cavity, and the cover plate 53 is configured for lidding the opening to close the accommodating cavity. The electrode assembly 52 is packaged in the accommodating cavity. The number of electrode assemblies 52 included in the battery cell 5 may be one or more and may be adjusted as needed.

Figure 3:
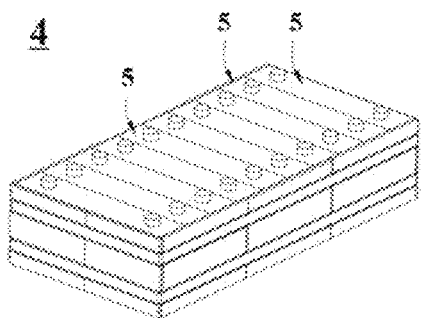
FIG. 3 is a schematic diagram of a battery module according to some embodiments of the present application.

In some embodiments, the battery cells may be assembled into a battery module. The number of battery cells included in the battery module may be more than one, and the specific number may be adjusted based on the application and capacity of the battery module. FIG. 3 is a schematic diagram of a battery module 4 as one example. As shown in FIG. 3, in the battery module 4, a plurality of battery cells 5 may be sequentially arranged in a length direction of the battery module 4. Certainly, the arrangement may also be in any other manner. Further, the plurality of battery cells 5 may be fixed by a fastener.

Optionally, the battery module 4 may further include a shell having an accommodating space in which the plurality of battery cells 5 are accommodated.

In some embodiments, the above battery module may further be assembled into a battery pack; the number of the battery modules included in the battery pack may be adjusted based on the application and capacity of the battery pack.

Figure 4:
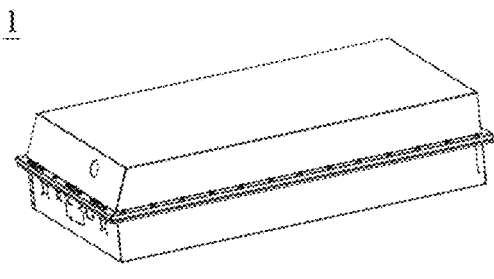
FIG. 4 is a schematic diagram of a battery pack according to some embodiments of the present application.
Figure 5:
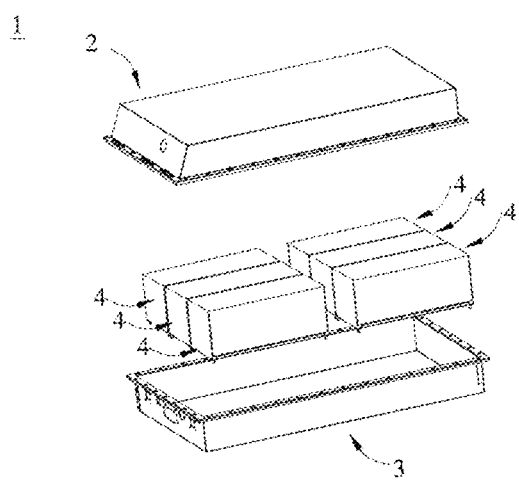
FIG. 5 is a schematic exploded view of the battery pack shown in FIG. 4.

FIGS. 4 and 5 are schematic diagrams of a battery pack 1 as one example. As shown in FIG. 4 and FIG. 5, the battery pack 1 may include a case and a plurality of battery modules 4 disposed in the case. The case includes an upper case body 2 and a lower case body 3. The upper case body 2 is configured for lidding the lower case body 3 to form a closed space for accommodating the battery modules 4. The plurality of battery modules 4 may be arranged in any manner in the case.

The battery cell provided by the embodiments of the present application may include a lithium battery cell and a sodium battery cell and may be, for example, a lithium-ion battery cell, a lithium metal battery cell, a negative electrode-free lithium metal battery cell, a sodium-ion battery cell, a sodium metal battery cell, a negative electrode-free sodium metal battery cell, or the like.

A negative electrode-free battery cell generally refers to a battery cell formed without actively arranging a negative electrode active material layer on the negative electrode side during the manufacturing of the battery cell. For example, during the manufacturing of the battery cell, a layer or carbonaceous active material layer is not arranged at the negative electrode by processes of coating, deposition, or the like to form a negative electrode active material layer. During the first charge, ions gain electrons at the negative electrode side and are deposited as metal on the surface of the negative electrode current collector. During discharge, the metal can be converted into ions and return to the positive electrode plate, thus achieving cyclic charge and discharge. Compared with other battery cells, the negative electrode-free battery cell can achieve higher energy density due to the absence of the negative electrode active material layer. In some embodiments, in order to improve the performance of the battery cell, the negative electrode side of the negative electrode-free battery cell may also be provided with some substances, such as carbon materials, which are conventionally used as negative electrode active materials. Although these materials have a certain capacity, they are not used as a main negative electrode active material in the battery cell due to the small content thereof. The battery cell thus configured can still be considered as a negative electrode-free battery cell. The cell balance (CB) value of the negative electrode-free battery cell is generally small. For example, in some embodiments, the CB value of the negative electrode-free battery cell may be less than or equal to 0.1. The CB value is defined as a ratio of the capacity per unit area of the negative electrode to the capacity per unit area of the positive electrode in the battery cell. Since the negative electrode-free battery cell includes no or only a small amount of the negative electrode active material, the capacity per unit area of the negative electrode is small, and thus the CB value is small, for example, generally less than or equal to 0.1.

As an important component of the battery cell, the performance of the separator is crucial to the performance of the battery. The separator is located between the positive electrode plate and the negative electrode plate, primarily serving to prevent short circuits. The separators currently used in commercial batteries are generally polyolefin (such as polyethylene and polypropylene) porous films. However, such separators have poor wettability against electrolytic solution and poor thermal stability. In addition, as the number of battery charging and discharging cycles increases, some dendrites will form at the negative electrode interface. The continuously growing dendrites will puncture the separator, causing internal short circuits, and in severe cases, even safety accidents such as combustion and explosion may occur.

In addition, a conventionally used separator is generally further provided with a ceramic coating, but the ceramic coating generally serves as a physical barrier, and as the number of battery charging and discharging cycles increases, there is still a possibility that the separator is punctured due to the growth of dendrites along pores of the ceramic coating, such that the problem of dendrite growth cannot be effectively alleviated.

Therefore, developing a separator that has good thermal stability and excellent wettability against electrolytic solution and is capable of alleviating the growth of dendrites is a technical problem that needs to be solved urgently in this field.

Figure 6:
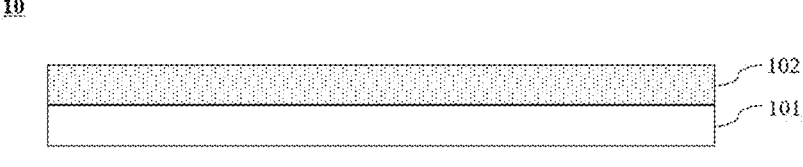
FIG. 6 is a schematic diagram of a separator according to some embodiments of the present application.
Figure 7:
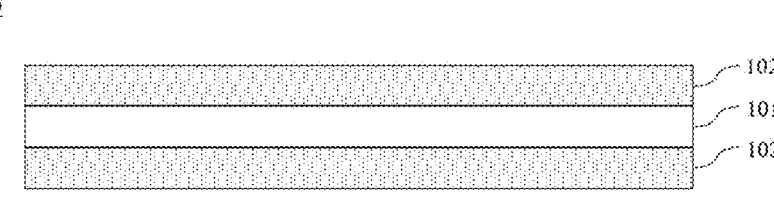
FIG. 7 is a schematic diagram of a separator according to some other embodiments of the present application.
Figure 8:
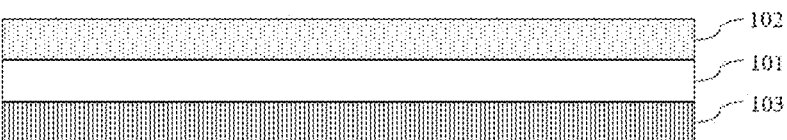
FIG. 8 is a schematic diagram of a separator according to yet some other embodiments of the present application.

FIG. 6 is a schematic diagram of a separator according to some embodiments of the present application. FIG. 7 is a schematic diagram of a separator according to some other embodiments of the present application. FIG. 8 is a schematic diagram of a separator according to yet some other embodiments of the present application.

As shown in FIGS. 6 to 8, a separator 10 includes a porous substrate 101 and a ferroelectric coating 102 located on at least one surface of the porous substrate 101. The ferroelectric coating 102 includes a ferroelectric material. The ferroelectric material includes an inorganic ferroelectric and a ferroelectric polymer. The ferroelectric polymer includes polyvinylidene fluoride and a copolymer thereof. The ferroelectric polymer includes β-phase polyvinylidene fluoride, and the content of the β-phase polyvinylidene fluoride in the ferroelectric polymer is greater than or equal to 60%.

The porous substrate is highly hydrophobic, while the electrolytic solution is generally a polar solvent, thereby resulting in poor wettability against electrolytic solution and high ion transfer impedance of the porous substrate. The ferroelectric coating introduced into the separator provided in the embodiments of the present application includes an inorganic ferroelectric and a ferroelectric polymer, such that the compatibility of the separator and the electrolytic solution can be improved, the wettability of the separator against the electrolytic solution is improved, and the ion transfer impedance of the separator is reduced, thereby enabling good cycle performance and rate capability of the battery. In addition, the ferroelectric coating introduced into the separator provided in the embodiments of the present application can also improve the heat resistance and mechanical strength of the separator.

During the reduction and deposition of ions at the negative electrode, local volume expansion will induce stress accumulation. The inorganic ferroelectric exhibits high dielectric constant and spontaneous polarization. The inorganic ferroelectric undergoes spontaneous polarization under the action of stress due to the influence of an electric field, such that the positive charge center of the inorganic ferroelectric moves toward the electron accumulation region of the negative electrode, thereby enabling the electron accumulation region to be wrapped therein; meanwhile, since the positive charge center of the inorganic ferroelectric is positively charged, which repels the polarity of the positively charged ions on the surface of dendrites, the growth direction of the dendrites can be changed, and the continuous growth of the dendrites in the direction perpendicular to the electrode plate can be slowed down, thereby reducing the internal short circuits of the battery. However, since the Curie temperature of the inorganic ferroelectric is generally low, the inorganic ferroelectric may undergo a ferroelectric-paraelectric transition in the preparation of the separator, thereby resulting in failure of the ferroelectric coating due to the loss of ferroelectricity. In addition, the inorganic ferroelectric generally has problems such as uneven distribution and low content in the separator coating.

Typical representatives of polyvinylidene fluoride are α-phase polyvinylidene fluoride and β-phase polyvinylidene fluoride. The α-phase polyvinylidene fluoride adopts a monoclinic crystal system with TGTG conformation, which has a net dipole moment of zero and thus exhibits no polarity; the β-phase polyvinylidene fluoride adopts an orthorhombic crystal system with all-trans TTTT conformation, which possesses significant spontaneous polarization and demonstrates excellent dielectric properties under an external electric field due to its susceptibility to polarization.

Currently, most of the binders used in the separator coating are α-phase polyvinylidene fluoride, which does not exhibit ferroelectricity.

The ferroelectric polymer in the ferroelectric coating of the separator provided in the embodiments of the present application includes β-phase polyvinylidene fluoride, and the content of the β-phase polyvinylidene fluoride in the ferroelectric polymer is greater than or equal to 60%, such that the ferroelectric polymer provided in the embodiments of the present application not only can serve as a binder, but also can have a high dielectric constant $\varepsilon_r$ and thereby enable the slowdown of continuous growth of dendrites in the direction perpendicular to the electrode plate and the reduction of internal short circuits of the battery.

Providing both the ferroelectric polymer and the inorganic ferroelectric in the ferroelectric coating can also reduce the probability of ferroelectricity loss of the ferroelectric coating due to the ferroelectric-paraelectric transition of the inorganic ferroelectric in the preparation of the separator and further enable long-term slowdown of continuous growth of dendrites in the direction perpendicular to the electrode plate. In addition, "dead lithium" and "dead sodium" may also be generated during the growth of dendrites, resulting in a substantial reduction of the capacity and coulombic efficiency of the battery. As such, the separator provided in the embodiments of the present application can further serve to improve the coulombic efficiency of the battery, and in particular, improve the coulombic efficiency of the battery under high rate capability.

Therefore, the separator provided in the embodiments of the present application can slow down the growth of dendrites and exhibits good wettability against electrolytic solution, low ion transfer impedance, low thermal shrinkage, and high mechanical strength, and thereby the separator can improve the reliability, coulombic efficiency, and rate capability of a battery when being applied to the battery.

In some embodiments, the content of the β-phase polyvinylidene fluoride in the ferroelectric polymer may be greater than or equal to 80%, optionally greater than or equal to 90%. As such, the continuous growth of dendrites in the direction perpendicular to the electrode plate can be further slowed down, the internal short circuits of the battery are reduced, and the coulombic efficiency and rate capability of the battery can be improved.

In some embodiments, the ferroelectric polymer may also include a small amount of the α-phase polyvinylidene fluoride and/or γ-phase polyvinylidene fluoride.

Optionally, the content of the α-phase polyvinylidene fluoride in the ferroelectric polymer may be less than or equal to 20%.

Optionally, the content of the γ-phase polyvinylidene fluoride in the ferroelectric polymer may be less than or equal to 10%.

The content of the β-phase polyvinylidene fluoride, the α-phase polyvinylidene fluoride, and the γ-phase polyvinylidene fluoride in the ferroelectric polymer can be calculated by Fourier transform infrared (FTIR) spectroscopy.

$$F_{(\beta,\gamma)} = \frac{A_{840}}{(K_{840}/K_{763})A_{763} + A_{840}} \times 100\%$$

$$F_\alpha = 100\% - F_{(\beta-\gamma)}$$

$$F_\beta = F_{(\beta,\gamma)} \times \frac{A_{1279}}{(A_{1279} + A_{1234})} \times 100\%$$

-continued $$F_\gamma = F_{(\beta,\gamma)} \times \frac{A_{1234}}{(A_{1279} + A_{1234})} \times 100\%$$

$F_\alpha$ represents the content of the $\alpha$ phase in the ferroelectric polymer.

$F_\beta$ represents the content of the $\beta$ phase in the ferroelectric polymer.

$F_\gamma$ represents the content of the $\gamma$ phase in the ferroelectric polymer.

$A_m$ represents the peak intensity of the absorption peak at different wavelengths m. The peak intensity of each absorption peak can be expressed by the integrated area of each absorption peak.

$K_m$ represents the absorption coefficient of the absorption peak at different wavelengths m.

In some embodiments, the dielectric constant $\varepsilon_r$ of the ferroelectric coating is greater than the dielectric constant $\varepsilon_r$ of the inorganic ferroelectric.

Optionally, the ratio of the dielectric constant $\varepsilon_r$ of the ferroelectric coating to the dielectric constant $\varepsilon_r$ of the inorganic ferroelectric may be greater than or equal to 1.6, and more optionally, greater than or equal to 2.0.

The dielectric constant $\varepsilon_r$ of the ferroelectric coating of the separator provided in the embodiments of the present application is greater than the dielectric constant $\varepsilon_r$ of the inorganic ferroelectric, such that the continuous growth of dendrites in the direction perpendicular to the electrode plate can be further slowed down, the internal short circuits of the battery are reduced, the reliability of the battery is improved, and the coulombic efficiency and rate capability of the battery can be improved.

In some embodiments, the dielectric constant $\varepsilon_r$ of the inorganic ferroelectric is greater than the dielectric constant $\varepsilon_r$ of the ferroelectric polymer.

In some embodiments, the dielectric constant $\varepsilon_r$ of the inorganic ferroelectric may be 200-8000, optionally 2000-6000.

In some embodiments, the dielectric constant $\varepsilon_r$ of the ferroelectric polymer may be 5-100, optionally 8-70.

The dielectric constant $\varepsilon_r$ of the ferroelectric coating, the dielectric constant $\varepsilon_r$ of the inorganic ferroelectric, and the dielectric constant $\varepsilon_r$ of the ferroelectric polymer can be measured as follows: At 25° C., an appropriate amount of sample powder is sandwiched between aluminum foils and then the resulting object is placed in a mold and pressed into a disc using a powder tablet press under a pressure of 2 Mpa and a holding time of 2 min; after the pressing, the sample disc is removed and tested for dielectric constant $\varepsilon_r$ using a precision digital LCR meter across a frequency range of 20 Hz to 2 MHz.

The dielectric constant mentioned in the present application represents a relative dielectric constant $\varepsilon_r$.

When the dielectric constant $\varepsilon_r$ of the ferroelectric coating is tested, sampling analysis may be conducted in the preparation process of the separator, or an appropriate amount of ferroelectric coating powder may also be obtained from the dried finished separator, for example, by scraping to obtain an appropriate amount of ferroelectric coating powder as the sample.

By adjusting the distribution pattern, weight content, particle size, $\beta$ phase content in the ferroelectric polymer, and other parameters of the inorganic ferroelectric and the ferroelectric polymer in the ferroelectric coating, the inorganic ferroelectric can be in synergism with the ferroelectric polymer to allow the dielectric constant $\varepsilon_r$ of the ferroelectric coating to be greater than both the dielectric constant $\varepsilon_r$ of the inorganic ferroelectric and the dielectric constant $\varepsilon_r$ of the ferroelectric polymer.

In some embodiments, at least a part of the ferroelectric polymer in the ferroelectric coating is located on at least a part of the surface of the inorganic ferroelectric. When the ferroelectric polymer is located on at least a part of the surface of the inorganic ferroelectric, the probability of ferroelectricity loss of the ferroelectric coating due to the ferroelectric-paraelectric transition of the inorganic ferroelectric in the preparation of the separator can be further reduced, thereby enabling more effective slowdown of continuous growth of dendrites in the direction perpendicular to the electrode plate, and additionally, the improvement of the coulombic efficiency of the battery can be facilitated. The ferroelectric polymer being located on at least a part of the surface of the inorganic ferroelectric can further enable the dielectric constant $\varepsilon_r$ of the ferroelectric coating to be greater than both the dielectric constant $\varepsilon_r$ of the inorganic ferroelectric and the dielectric constant $\varepsilon_r$ of the ferroelectric polymer.

In some embodiments, the weight content of the inorganic ferroelectric in the ferroelectric material may be 80%-99%, optionally 85%-95%.

In some embodiments, the weight content of the ferroelectric polymer in the ferroelectric material may be 1%-20%, optionally 5%-15%.

By adjusting the weight content of the inorganic ferroelectric and the ferroelectric polymer in the ferroelectric material within the above range, the dielectric constant $\varepsilon_r$ of the ferroelectric coating can be increased, such that the dielectric constant $\varepsilon_r$ of the ferroelectric coating is greater than both the dielectric constant $\varepsilon_r$ of the inorganic ferroelectric and the dielectric constant $\varepsilon_r$ of the ferroelectric polymer, thereby enabling more effective slowdown of continuous growth of dendrites in the direction perpendicular to the electrode plate, reducing internal short circuits of the battery, improving the reliability and coulombic efficiency of the battery, and additionally, increasing the adhesion between the ferroelectric coating and the pores.

In some embodiments, the Curie temperature of the ferroelectric polymer may be 150° C. to 250° C., optionally 160° C. to 200° C.

In some embodiments, the remanent polarization of the ferroelectric polymer may be 10 mC/m² to 1000 mC/m², optionally 20 mC/m² to 800 mC/m².

In some embodiments, the weight-average molecular weight of the ferroelectric polymer may be 200,000-800,000, optionally 400,000-650,000.

The weight-average molecular weight of the ferroelectric polymer being within the above range enables a suitable crystallinity, a suitable Curie temperature, and a high dielectric constant $\varepsilon_r$ of the ferroelectric polymer, and also enables a suitable viscosity of the ferroelectric polymer.

The weight-average molecular weight of the ferroelectric polymer has a meaning well known in the art and can be measured by a method known in the art. For example, the test may be performed using gel permeation chromatography (GPC).

In some embodiments, the melting temperature of the ferroelectric polymer may be 140° C. to 220° C., optionally 143° C. to 200° C.

The melting point of the ferroelectric polymer being within the above range enables a suitable crystallinity, a suitable Curie temperature, and a high dielectric constant & of the ferroelectric polymer, and also enables a suitable viscosity of the ferroelectric polymer.

The melting temperature of the ferroelectric polymer may be tested using differential scanning calorimetry (DSC). The test temperature may range from 25° C. to 400° C. and the heating rate may be 10° C./min.

In some embodiments, the crystallinity of the ferroelectric polymer may be greater than or equal to 45%, optionally 45%-68%. The crystallinity of the ferroelectric polymer being within the above range can reduce the thermal shrinkage of the separator and improve the mechanical strength of the separator.

In some embodiments, the ferroelectric polymer may include one or more of polyvinylidene fluoride (i.e., vinylidene fluoride (VDF) monomer homopolymer, abbreviated as PVDF) and copolymers of a vinylidene fluoride monomer with other monomers.

By introducing other monomers into the VDF crystal region, the large-size ferroelectric phase domain can be divided into nano-size ones, and the nano-ferroelectric phase domains can easily respond to the change of an external electric field, thereby exhibiting a unique relaxor ferroelectric behavior, and thus enabling the dielectric constant $\varepsilon_r$ of the ferroelectric polymer to be further improved and the dielectric loss to be further reduced.

Optionally, other monomers may include, but are not limited to, one or more of trifluoroethylene, chlorotrifluoroethylene, fluorinated acetylene, and hexafluoropropylene.

Optionally, the copolymers of the vinylidene fluoride monomer with other monomers may include, but are not limited to, one or more of a vinylidene fluoride-trifluoroethylene copolymer (abbreviated as P(VDF-TrFE)), a vinylidene fluoride-trifluoroethylene-chlorotrifluoroethylene copolymer (abbreviated as P(VDF-TrFE-CFE)), a vinylidene fluoride-trifluoroethylene-chlorotrifluoroethylene-fluorinated acetylene copolymer (abbreviated as P(VDF-TrFE-CFE-FA)), and a vinylidene fluoride-hexafluoropropylene copolymer (abbreviated as P(VDF-HFP)).

In some embodiments, the volume distribution particle size Dv50 of the ferroelectric polymer may be 10 nm to 150 nm, optionally 15 nm to 50 nm.

In some embodiments, the volume distribution particle size Dv50 of the inorganic ferroelectric may be 0.05 μm to 5 μm, optionally 0.1 μm to 1 μm. The volume distribution particle size Dv50 of the inorganic ferroelectric being within the above range enables a suitable viscosity of the ferroelectric coating slurry to facilitate the coating and can improve the uniformity and consistency of the ferroelectric coating. Additionally, this is also conducive to increasing the adhesion between the ferroelectric coating and the pores and reducing powder falling. Furthermore, the problem of pore blocking can also be reduced, and the breathability and ion transfer characteristics of the separator are improved.

In some embodiments, the Curie temperature of the inorganic ferroelectric may be 110° C. to 150° C., optionally 120° C. to 140° C.

In some embodiments, the inorganic ferroelectric may be, but is not limited to, one or more of a perovskite type, a tungsten bronze type, a bismuth layer type, a pyrochlore type, a niobate type, and lead barium lithium niobate. Optionally, the inorganic ferroelectric may include a perovskite type.

Optionally, the perovskite type may have a molecular formula of $Ba_{1-x}A_xTi_{1-y}B_yO_3$.

A may include, but is not limited to, one of or a combination of more of Bi, Pb, Sr, Ca, K, Na, and Cd, B may include, but is not limited to, one of or a combination of more of Fe, Sn, Hf, Zr, Ce, Nb, and Th, $0 \leq x \leq 1$, and $0 \leq y \leq 1$.

Optionally, the perovskite type may include, but is not limited to, one or more of barium titanate ($BaTiO_3$), $Ba_{1-x1}Sr_{x1}TiO_3$ ($0 \leq x1 \leq 1$), $SrTiO_3$, $PbTiO_3$, $BiFeO_3$, $PbZr_{y1}Ti_{1-y1}O_3$ ($0 \leq y1 \leq 1$), and $BaZr_{y2}Ti_{1-y2}O_3$ ($0 < y2 < 1$).

Optionally, the tungsten bronze type may have a molecular formula of $M_zWO_3$. M may include, but is not limited to, one or more of Na, K, Rb, and Cs, and $0 < z < 1$.

Optionally, the tungsten bronze type may include, but is not limited to, one or more of $Na_{z1}WO_3$ ($0 < z1 < 1$) and $K_{z2}WO_3$ ($0 < z2 < 1$).

Optionally, the bismuth layer type may have a molecular formula of $(Bi_2O_2)(C_{n-1}D_nO_{3n+1})$. C may include, but is not limited to, one or more of Na, K, Ba, Sr, Pb, Ca, Ln, and Bi, D may include, but is not limited to, one or more of Zr, Cr, Nb, Ta, Mo, W, Fe, Ti, and V, and $2 \leq n \leq 5$.

Optionally, the bismuth layer type may include, but is not limited to, one or more of $SrBi_2Nb_2O_9$, $SrBi_2Ta_2O_9$, $SrBi_2Nb_2O_9$, and $Bi_4Ti_3O_{12}$.

Optionally, the pyrochlore type may include, but is not limited to, one or more of lead metaniobate ($PbNb_2O_6$) and $Cd_2Nb_2O_7$.

Optionally, the niobate type may include, but is not limited to, one or more of $LiNbO_3$, $KNbO_3$, and $NaNbO_3$.

In some embodiments, the thickness of the ferroelectric coating may be 1 μm to 3.5 μm, optionally 1.5 μm to 3 μm. As such, the battery can have high reliability, high coulombic efficiency, and good rate capability.

In some embodiments, the areal density of the ferroelectric coating may be 2.5 g/m² to 15 g/m², optionally 3 g/m² to 12 g/m². As such, the battery can have high reliability, high coulombic efficiency, and good rate capability.

In some embodiments, the ferroelectric coating may also include a dispersant.

Optionally, the dispersant may include, but is not limited to, one or more of hydrolyzed polymaleic anhydride, polyacrylic acid, an acrylic block copolymer, a polyester block copolymer, a polyethylene glycol polyol, polyethyleneimine, and respective derivatives thereof. Derivatives generally refer to products derived from the replacement of hydrogen atoms or atomic groups in a polymer by other atoms or atomic groups.

Optionally, the ratio of the total weight of the ferroelectric material to the weight of the dispersant may be 1:(0.01-0.02), optionally 1:(0.010-0.015).

An appropriate amount of the dispersant can ensure uniform dispersion of the ferroelectric coating slurry to facilitate the coating, and also enable improved weight of the ferroelectric coating.

In some embodiments, the ferroelectric coating may further include a thickener.

Optionally, the thickener may include, but is not limited to, one or more of sodium hydroxymethylcellulose, methyl cellulose, hydroxyethyl cellulose, hydroxypropyl methyl cellulose, polyacrylate, polyurethane, and polyether.

Optionally, the ratio of the total weight of the ferroelectric material to the weight of the thickener may be 1:(0.01-0.02), optionally 1:(0.010-0.015).

An appropriate amount of the thickener can improve the stability of the ferroelectric coating slurry to facilitate the coating, and also enable improved weight of the ferroelectric coating.

The ferroelectric coating 102 is located on at least one surface of the porous substrate 101. In some embodiments, as shown in FIG. 6, the ferroelectric coating 102 may be located on one of the surfaces of the porous substrate 101;

in some embodiments, as shown in FIG. 7, the ferroelectric coating 102 may also be located on two surfaces of the porous substrate 101.

In some embodiments, as shown in FIG. 8, the ferroelectric coating 102 is located on one of the surfaces of the porous substrate 101, and a ceramic coating 103 may also be disposed on the other surface of the porous substrate 101; when applied to a battery, the ferroelectric coating 102 may face the negative electrode and the ceramic coating 103 may face the positive electrode.

In some embodiments, the thickness of the porous substrate may be 4 μm to 15 μm, optionally 5 μm to 10 μm.

In some embodiments, the porous substrate may include, but is not limited to, one or more of polyolefin (e.g., polyethylene or polypropylene), halogenated polyolefin (e.g., polytetrafluoroethylene, polyvinylidene fluoride, or polyvinyl chloride), polyamide, polyester (e.g., polyethylene terephthalate), and respective derivatives thereof. Derivatives generally refer to products derived from the replacement of hydrogen atoms or atomic groups in a polymer by other atoms or atomic groups.

[Method for Preparing Separator]

Embodiments of the present application also provide a method for preparing a separator.

The preparation method includes the following steps: providing a porous substrate; providing a ferroelectric coating slurry (dispersing a ferroelectric material into a solvent to obtain the ferroelectric coating slurry); coating (coating at least one surface of the porous substrate with the ferroelectric coating slurry); and drying to obtain the separator.

In some embodiments, the drying temperature of the ferroelectric coating slurry may be 60° C. to 80° C., and the drying time may be 5 min to 30 min.

In some embodiments, the ferroelectric coating slurry may be applied by a method including, but not limited to, gravure transfer coating, rotary spray coating, dip coating, blade coating, and the like.

In some embodiments, the solvent in the ferroelectric coating slurry may include, but is not limited to, one or more of deionized water, N,N-dimethylformamide (DMF), N-methylpyrrolidone (NMP), N,N-dimethylacetamide (DMAC), and tetrahydrofuran (THF).

In some embodiments, the solid content of the ferroelectric coating slurry may be 25%-45%, optionally 30%-40%. As such, the coating is facilitated.

In some embodiments, the ferroelectric coating slurry may further include one or more of a dispersant and a thickener.

In some embodiments, the step of providing a ferroelectric coating slurry may include the following steps: subjecting a ferroelectric material, a dispersant, and a solvent to primary dispersion to obtain a primary dispersion solution; and adding a thickener into the resulting primary dispersion solution for secondary dispersion to obtain the ferroelectric coating slurry.

Optionally, the process for the primary dispersion may be ultrasonic dispersion, and stirring may be performed during the ultrasonic dispersion. Optionally, the stirring speed during the ultrasonic dispersion may be 700 rpm to 1200 rpm, and the ultrasonic dispersion time may be 30 min to 60 min.

Optionally, the process for the secondary dispersion may be ultrasonic dispersion, and stirring may be performed during the ultrasonic dispersion. Optionally, the stirring speed during the ultrasonic dispersion may be 1000 rpm to 1600 rpm, and the ultrasonic dispersion time may be 30 min to 90 min.

In some embodiments, the method for preparing the separator may further include the step of providing a ferroelectric material, which includes: stirring and dispersing a ferroelectric polymer and a first solvent uniformly to obtain a clear solution; adding an inorganic ferroelectric into the resulting clear solution, and stirring and dispersing uniformly to obtain a slurry; and drying the resulting slurry to obtain the ferroelectric material.

Optionally, the first solvent may include absolute ethanol, N-methylpyrrolidone (NMP), or the like.

Optionally, after the ferroelectric polymer and the first solvent are uniformly stirred, ultrasonic dispersion may be performed. The ultrasonic dispersion time may be 20 min to 60 min.

Optionally, after the inorganic ferroelectric is added to the resulting clear solution and stirred uniformly, ultrasonic dispersion may be performed. The ultrasonic dispersion time may be 30 min to 60 min.

Optionally, the slurry may be dried in a drying oven, and the drying temperature may be 75° C. to 95° C.

Optionally, the method for preparing the separator may further include the step of grinding the resulting ferroelectric material.

In some embodiments, the method for preparing the separator may further include the step of preparing a ceramic coating slurry and applying the ceramic coating slurry on the surface of the porous substrate without the ferroelectric coating.

For some raw materials used in the method for preparing a separator provided in the embodiments of the present application and their content and other parameters, reference can be made to the separator provided in the embodiments of the present application, and the details will not be repeated here.

Unless otherwise specified, all raw materials used in the method for preparing a separator are commercially available.

[Positive Electrode Plate]

The structure and composition of the positive electrode plate may be selected according to the type of battery cell, which is not limited in the embodiments of the present application.

In some embodiments, the positive electrode plate includes a positive electrode current collector and a positive electrode film layer disposed on at least one surface of the positive electrode current collector and including a positive electrode active material. For example, the positive electrode current collector is provided with two surfaces opposite to each other in its own thickness direction, and the positive electrode film layer is disposed on any one or both of the two opposite surfaces of the positive electrode current collector.

When the battery is a lithium battery, the positive electrode active material includes a material that enables the deintercalation and intercalation of lithium. As an example, the positive electrode active material may include, but is not limited to, one or more of a lithium transition metal oxide, a metal chalcogenide, a lithium-containing phosphate, and respective modified compounds thereof. Examples of the lithium transition metal oxide may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, lithium titanium oxide, and respective modified compounds thereof. The lithium transition metal oxide may be of, but is not limited to, a layered structure or a spinel structure. Examples of the lithium-containing phosphate may include, but are not limited to, one or more of lithium iron phosphate, a composite material of lithium iron phosphate and carbon, lithium manganese phosphate, a composite material of lithium manganese phosphate and carbon, lithium iron manganese phosphate, a composite material of lithium iron manganese phosphate and carbon, and respective modified compounds thereof.

In some embodiments, in order to further improve the energy density of the battery, the positive electrode active material may include one or more of lithium transition metal oxides with the general formula $Li_aNi_bCo_cM_dO_eD_f$ and modified compounds thereof, where $0.8 \leq a \leq 1.2$, $0.5 \leq b < 1$, $0 < c < 1$, $0 < d < 1$, $1 \leq e \leq 2$, $0 \leq f \leq 1$, M may include, but is not limited to, one or more of Ge, Mo, Sn, Mn, Al, Zr, Zn, Cu, Cr, Mg, Fe, V, Ti, and B, and D may include, but is not limited to, one or more of N, F, S, and Cl.

In some embodiments, the positive electrode active material may include both a lithium transition metal oxide and a lithium-containing phosphate. As such, this is conducive to obtaining a battery that achieves a large capacity and high reliability.

As an example, the positive electrode active material may include, but is not limited to, one or more of $LiCoO_2$, $LiNiO_2$, $LiMnO_2$, $LiNi_{1/2}Mn_{1/2}O_2$, $LiMn_2O_4$, $Li_{4/3}Ti_{5/3}O_4$, $LiNi_{1/2}Mn_{1/2}O_2$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.80}Co_{0.15}Al_{0.05}O_2$, $LiFePO_4$, $LiMnPO_4$, and $Li_{1.13}Ti_{0.57}Fe_{0.3}S_2$.

When the battery is a sodium battery, the positive electrode active material includes a material that enables the deintercalation and intercalation of sodium. As an example, the positive electrode active material may include, but is not limited to, one or more of a layered transition metal oxide (including, but not limited to, P2 type, O3 type, etc.), a polyanionic material (such as phosphates, fluorophosphates, pyrophosphates, and sulfates), and a Prussian-type material.

In some embodiments, as an example, the positive electrode active material may include, but is not limited to, one or more of $NaFeO_2$, $NaCoO_2$, $NaCrO_2$, $NaMnO_2$, $NaNiO_2$, $Na_{0.67}MO_2$ (M includes at least two of Fe, Co, Cr, Mn, Ni, V, Ti, and Mo), $NaMO_2$ (M includes at least two of Fe, Co, Ni, V, Ti, and Mo), $NaFePO_4$, $NaMnPO_4$, $NaCoPO_4$, $Na_4Fe_3(PO_4)_2P_2O_7$, $Na_3V_2(PO_4)_2F_3$, $Na_3V_2(PO_4)_3$, Prussian blue, Prussian white, and respective modified compounds thereof.

The modified compounds of the above positive electrode active materials may be obtained by doping modification and/or surface-coating modification of the positive electrode active materials.

In some embodiments, the positive electrode film layer further optionally includes a positive electrode conductive agent. As an example, the positive electrode conductive agent may include, but is not limited to, one or more of superconducting carbon, conductive graphite, acetylene black, carbon black, Ketjen black, a carbon dot, a carbon nanotube, graphene, and a carbon nanofiber.

In some embodiments, the positive electrode film layer further optionally includes a positive electrode binder. As an example, the positive electrode binder may include, but is not limited to, one or more of polyvinylidene difluoride (PVDF), polytetrafluoroethylene (PTFE), a vinylidene fluoride-tetrafluoroethylene-propylene terpolymer, a vinylidene difluoride-hexafluoropropylene-tetrafluoroethylene terpolymer, a tetrafluoroethylene-hexafluoropropylene copolymer, fluorinated acrylate resin, styrene-butadiene rubber (SBR), water-soluble unsaturated resin SR-1B, aqueous acrylic resin (e.g., polyacrylic acid (PAA)), poly(methacrylic acid) (PMAA), sodium polyacrylate (PAAS), polyacrylamide (PAM), polyvinyl alcohol (PVA), sodium alginate (SA), and carboxymethyl chitosan (CMCS).

In some embodiments, a metal foil or a composite current collector may be used as the positive electrode current collector. As an example of the metal foil, an aluminum foil may be used. The composite current collector may include a polymer material substrate and a metal material layer formed on at least one surface of the polymer material substrate. As an example, the metal material may include, but is not limited to, one or more of aluminum, an aluminum alloy, nickel, a nickel alloy, titanium, a titanium alloy, silver, and a silver alloy. As an example, the polymer material substrate may include, but is not limited to, one or more of polypropylene (PP), polyethylene terephthalate (PET), polybutylene terephthalate (PBT), polystyrene (PS), and polyethylene (PE).

The positive electrode film layer is generally formed by coating a positive electrode current collector with a positive electrode slurry, drying, and cold pressing. The positive electrode slurry is generally formed by dispersing the positive electrode active material, an optional positive electrode conductive agent, an optional positive electrode binder, and any other components in a solvent and stirring them uniformly. The solvent may be N-methylpyrrolidone (NMP), but is not limited thereto.

[Negative Electrode Plate]

A battery cell includes a negative electrode plate. The structure and composition of the negative electrode plate may be selected according to the type of battery cell, which is not limited in the embodiments of the present application.

In some embodiments, the negative electrode plate may include a negative electrode current collector and a negative electrode film layer disposed on at least one surface of the negative electrode current collector and including a negative electrode active material. For example, the negative electrode current collector is provided with two surfaces opposite to each other in its own thickness direction, and the negative electrode film layer is disposed on any one or both of the two opposite surfaces of the negative electrode current collector.

The negative electrode active material may be any material known in the art. As an example, the negative electrode active material may include, but is not limited to, one or more of a carbon-based material, a silicon-based material, a tin-based material, and lithium titanate. The carbon-based material may include, but is not limited to, one or more of natural graphite, artificial graphite, soft carbon, hard carbon, pyrolytic carbon, coke, glassy carbon, a sintered body of an organic polymer compound, and a mesocarbon microbead. The silicon-based material may include, but is not limited to, one or more of elemental silicon, an oxide of silicon, a silicon-carbon composite, a silicon-nitrogen composite, and a silicon alloy material. The tin-based material may include, but is not limited to, one or more of elemental tin, an oxide of tin, and a tin alloy material.

In some embodiments, the negative electrode film layer further optionally includes a negative electrode conductive agent. As an example, the negative electrode conductive agent may include, but is not limited to, one or more of superconducting carbon, conductive graphite, acetylene black, carbon black, Ketjen black, a carbon dot, a carbon nanotube, graphene, and a carbon nanofiber.

In some embodiments, the negative electrode film layer further optionally includes a negative electrode binder. As an example, the negative electrode binder may include, but is not limited to, one or more of styrene-butadiene rubber (SBR), water-soluble unsaturated resin SR-1B, aqueous acrylic resin (e.g., polyacrylic acid (PAA), poly(methacrylic acid) (PMAA), and sodium polyacrylate (PAAS)), polyacrylamide (PAM), polyvinyl alcohol (PVA), sodium alginate (SA), and carboxymethyl chitosan (CMCS).

In some embodiments, the negative electrode film layer further optionally includes other auxiliary agents. As an example, other auxiliary agents may include thickeners, such as sodium carboxymethylcellulose (CMC) and PTC thermistor materials.

The negative electrode film layer is generally formed by coating a negative electrode current collector with a negative electrode slurry, drying, and cold pressing. The negative electrode slurry is generally formed by dispersing a negative electrode active material, an optional conductive agent, an optional binder, and other optional auxiliary agents in a solvent and uniformly stirring. The solvent may be N-methylpyrrolidone (NMP) or deionized water, but is not limited thereto.

The negative electrode plate does not exclude additional functional layers other than the negative electrode film layer. For example, in some embodiments, the negative electrode plate may further include a conductive bottom coating (e.g., composed of a conductive agent and a binder) interposed between the negative electrode current collector and the negative electrode film layer and disposed on the surface of the negative electrode current collector. In some embodiments, the negative electrode plate may further include a protective layer covering the surface of the negative electrode film layer.

In some embodiments, the negative electrode plate may include a negative electrode current collector and a metal layer disposed on at least one surface of the negative electrode current collector, and the metal material in the metal layer may include, but is not limited to, one or more of elemental lithium, a lithium alloy, elemental sodium, and a sodium alloy.

The lithium alloy may be an alloy formed by metallic lithium with other metallic elements or non-metallic elements. As an example, the other metallic elements in the lithium alloy may include, but are not limited to, one or more elements of tin, zinc, aluminum, magnesium, silver, gold, gallium, indium, and platinum, and the non-metallic elements in the lithium alloy may include one or more elements of boron, carbon, and silicon.

The sodium alloy may be an alloy formed by metallic sodium with other metallic elements or non-metallic elements. As an example, the other metallic elements in the sodium alloy may include, but are not limited to, one or more elements of tin, zinc, aluminum, magnesium, silver, gold, gallium, indium, and platinum, and the non-metallic elements in the sodium alloy may include one or more elements of boron, carbon, and silicon.

In some embodiments, a lithium plate (foil), a lithium alloy plate (foil), a sodium plate (foil), or a sodium alloy plate (foil) may be used as the negative electrode plate.

In some embodiments, the negative electrode plate may include a negative electrode current collector to assemble to form a negative electrode-free battery cell.

In some embodiments, the negative electrode current collector may include, but is not limited to, one or more of a metal foil, a metal foam current collector, a metal mesh-like current collector, a carbon felt current collector, a carbon cloth current collector, a carbon paper current collector, and a composite current collector.

As an example of the metal foil, a copper foil, a copper alloy foil, a nickel foil, a nickel alloy foil, an aluminum foil, or an aluminum alloy foil may be used. As an example of the metal foam current collector, foam copper, foam nickel, or foam aluminum may be used. As an example of the metal mesh-like current collector, a copper mesh, a nickel mesh, or an aluminum mesh may be used.

The composite current collector may include a polymer material substrate and a metal material layer formed on at least one surface of the polymer material substrate. As an example, the metal material may include, but is not limited to, one or more of copper, a copper alloy, nickel, a nickel alloy, titanium, a titanium alloy, aluminum, an aluminum alloy, silver, and a silver alloy. As an example, the polymer material substrate may include, but is not limited to, one or more of polypropylene (PP), polyethylene terephthalate (PET), polybutylene terephthalate (PBT), polystyrene (PS), and polyethylene (PE).

[Electrolyte]

A battery cell includes an electrolyte. The present application has no specific restrictions on the type of the electrolyte, which can be selected according to needs. For example, the electrolyte may include one or more selected from a solid-state electrolyte and a liquid electrolyte (i.e., an electrolytic solution).

In some embodiments, the electrolyte is an electrolytic solution including an electrolyte salt and an organic solvent.

The electrolyte salt may include phosphate, perchlorate, an organoboron salt, a fluorine-containing organic salt, an imide salt, or the like.

When the battery is a lithium battery, as an example, the electrolyte salt may include, but is not limited to, one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluorobis(oxalato)phosphate (LiDFOP), and lithium tetrafluoro(oxalato)phosphate (LiTFOP).

When the battery is a sodium battery, as an example, the electrolyte salt may include, but is not limited to, sodium hexafluorophosphate ($NaPF_6$), sodium tetrafluoroborate ($NaBF_4$), sodium perchlorate ($NaClO_4$), sodium hexafluoroarsenate ($NaAsF_6$), sodium bis(fluorosulfonyl)imide (NaFSI), sodium bis(trifluoromethanesulfonyl)imide (NaTFSI), sodium trifluoromethanesulfonate (NaTFS), sodium difluoro(oxalato)borate (NaDFOB), sodium bis(oxalato)borate (NaBOB), sodium difluorophosphate ($NaPO_2F_2$), sodium difluorobis(oxalato)phosphate (NaDFOP), and sodium tetrafluoro(oxalato)phosphate.

In some embodiments, the concentration of the electrolyte salt may be no less than 0.3 mol/L, optionally no less than 0.7 mol/L. The concentration of the electrolyte salt may further be no more than 4 mol/L, optionally no more than 2.5 mol/L or no more than 1.7 mol/L.

The organic solvent may include, but is not limited to, one or more of an ester, an ether, a sulfone, a nitrile, and the like. The ester may include, but is not limited to, one or more of a carbonate, a phosphate, a carboxylate, a sulfate, a sulfonate, and the like. The carbonate may include a cyclic carbonate and/or a chain carbonate. The chain carbonate may include a low-viscosity polar chain carbonate, an aliphatic branched carbonate, or the like.

As an example, the organic solvent may include, but is not limited to, one or more of ethylene carbonate (EC), propylene carbonate (PC), butene carbonate, ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), diethyl sulfone (ESE), tetraethylene glycol dimethyl ether (TEGDME), ethylene glycol dimethyl ether (DME), 1,3-dioxolane (DOL), trimethyl phosphate, 3-methoxypropionitrile, $H(CF_2)_2OCH_3$, $C_4F_9OCH_3$, $H(CF_2)_2OCH_2CH_3$, $H(CF_2)_2OCH_2CF_3$, $H(CF_2)_2CH_2O(CF_2)_2H$, $CF_3CHFCF_2OCH_3$, $CF_3CHFCF_2OCH_2CH_3$, 2-trifluoromethylhexafluoropropyl methyl ether, 2-trifluoromethylhexafluoropropyl ethyl ether, 2-trifluoromethylhexafluoropropyl propyl ether, 3-trifluoromethyloctafluorobutyl methyl ether, 3-trifluoromethyloctafluorobutyl ethyl ether, 3-trifluoromethyloctafluorobutyl propyl ether, 4-trifluoromethyldecafluoropentyl methyl ether, 4-trifluoromethyldecafluoropentyl ethyl ether, 4-trifluoromethyldecafluoropentyl propyl ether, 5-trifluoromethyldodecafluorohexyl methyl ether, 5-trifluoromethyldodecafluorohexyl ethyl ether, 5-trifluoromethyldodecafluorohexyl propyl ether, 6-trifluoromethyltetradecafluoroheptyl methyl ether, 6-trifluoromethyltetradecafluoroheptyl ethyl ether, 6-trifluoromethyltetradecafluoroheptyl propyl ether, 7-trifluoromethylhexadecafluorooctyl methyl ether, 7-trifluoromethylhexadecafluorooctyl ethyl ether, and 7-trifluoromethylhexadecafluorooctyl propyl ether.

In some embodiments, the electrolytic solution further optionally includes an additive. For example, the additive may include a negative electrode film-forming additive, or may include a positive electrode film-forming additive, or may include an additive capable of improving certain properties of the battery, such as an additive for improving the overcharge performance of the battery, an additive for improving the high-temperature performance of the battery, or an additive for improving the low-temperature power performance of the battery.

Methods for preparing a battery cell are well known. In some embodiments, the positive electrode plate, the separator, the negative electrode plate, and the electrolytic solution may be assembled to form a battery cell. As an example, the positive electrode plate, the separator, and the negative electrode plate may form an electrode assembly through a winding process and/or a stacking process. The electrode assembly is placed in an outer packaging, dried, and then injected with the electrolytic solution described above. After undergoing processes such as vacuum packaging, standing, and formation, a battery cell is obtained. A plurality of battery cells may be further connected in series or in parallel or in series-parallel to form a battery module. A plurality of battery modules may further be connected in series or in parallel or in series-parallel to form a battery pack. In some embodiments, a plurality of battery cells may also directly constitute a battery pack.

Embodiments of the present application further provide an electric device, which includes the battery provided in the embodiments of the present application. The battery may be used as a power source for the electric device, or as an energy storage unit for the electric device. The electric device may be, but is not limited to, a mobile device (e.g., a mobile phone, a tablet computer, or a laptop computer), an electric vehicle (e.g., a pure electric vehicle, a hybrid electric vehicle, a plug-in hybrid electric vehicle, an electric bicycle, an electric scooter, an electric golf cart, or an electric truck), an electric train, ship, or satellite, an energy storage system, or the like.

The electric device can select a type of battery according to its use requirements, such as a battery cell, a battery module, or a battery pack.

Figure 9:
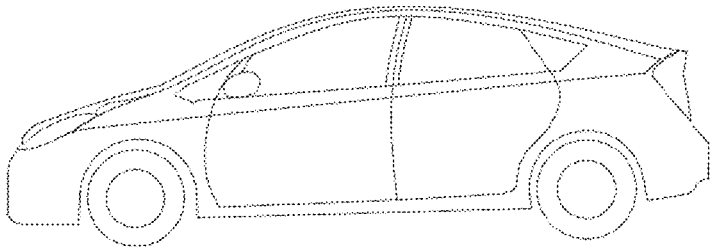
FIG. 9 is a schematic diagram of an electric device according to some embodiments of the present application.

FIG. 9 is a schematic diagram of an electric device as one example. The electric device is a pure electric vehicle, a hybrid electric vehicle, a plug-in hybrid electric vehicle, or the like. To meet the requirements of the electric device for high power and high energy density of the battery, a battery pack or a battery module may be used.

As another example, the electric device may be a mobile phone, a tablet computer, a laptop computer, or the like. The electric device is generally required to be light and thin, and a battery cell may thus be used as the power source.

EXAMPLES

The following examples more specifically describe the content disclosed in the present application. These examples are intended for illustrative purposes only, since various modifications and changes within the scope of the content disclosed in the present application will be apparent to those skilled in the art. Unless otherwise stated, all parts, percentages, and ratios reported in the following examples are based on weight, and all reagents used in the examples are commercially available or synthesized according to conventional methods and can be used directly without further treatment, and the instruments used in the examples are all commercially available.

Example 1

Barium titanate ($BaTiO_3$) powder and ferroelectric polymer powder were weighed out in a weight ratio of 90:10. The barium titanate powder was in a tetragonal phase with a volume distribution particle size Dv50 of 0.3 μm and a dielectric constant $\varepsilon_r$ of 5460. The PVDF of the ferroelectric polymer had a β phase content of 90%, a crystallinity of 65%, a dielectric constant $\varepsilon_r$ of 9.6, a melting temperature of 150° C., and a weight-average molecular weight of 540,000.

The ferroelectric polymer powder and absolute ethanol were mixed and stirred uniformly, and the mixture was then put into an ultrasonic machine for ultrasonic dispersion for 35 min to 45 min to obtain a clear solution. The barium titanate powder was added to the above clear solution and uniformly vortexed, and then the mixture was put into the ultrasonic machine for ultrasonic dispersion for 45 min to 50 min to obtain a slurry. The slurry was placed in a drying oven and dried at 90° C., and the dried powder was put into a mortar for grinding to obtain ferroelectric material powder.

The resulting ferroelectric material powder was uniformly dispersed into NMP, and hydrolyzed polymaleic anhydride was then added, followed by ultrasonic dispersion. After 2 h of ultrasonic dispersion, sodium hydroxymethylcellulose was added, and then secondary dispersion was performed to obtain a ferroelectric coating slurry with a solid content of about 35%. In the ferroelectric coating slurry, the weight ratio of the ferroelectric material, the hydrolyzed polymaleic anhydride, and the sodium hydroxymethylcellulose was 1:0.01:0.01.

One surface of a PE porous substrate with a porosity of 50% and a thickness of 9 μm was coated with the resulting ferroelectric coating slurry by gravure transfer coating, followed by drying in vacuum at 60° C. to obtain a separator. The thickness of the ferroelectric coating was 3 μm and the areal density was 6 g/m².

Examples 2-5

The separator was prepared in a similar manner to that of Example 1, except that the β phase content of the ferroelectric polymer used was different. Specific parameters are shown in Table 1.

Comparative Example 1

Aluminum oxide powder and polyacrylic acid were uniformly dispersed into NMP at a weight ratio of 90:10 to obtain a ceramic coating slurry. One surface of a PE porous substrate with a porosity of 50% and a thickness of 9 μm was coated with the resulting ceramic coating slurry by gravure transfer coating, followed by drying in vacuum at 60° C. to obtain a separator. The thickness of the ceramic coating was 3 μm.

Comparative Example 2

The separator was prepared in a similar manner to that of Example 1, except that α-phase polyvinylidene fluoride was used instead of the ferroelectric polymer, and the α phase content was no less than 75%.

Comparative Example 3

The separator was prepared in a similar manner to that of Example 1, except that the β phase content of the ferroelectric polymer used was 30%. Specific parameters are shown in Table 1.

Example 6

The separator was prepared in a similar manner to that of Example 1, except that the weight ratio of the barium titanate powder to the ferroelectric polymer powder was 99.5:0.5.

Example 7

The separator was prepared in a similar manner to that of Example 1, except that the weight ratio of the barium titanate powder to the ferroelectric polymer powder was 99:1.

Example 8

The separator was prepared in a similar manner to that of Example 1, except that the weight ratio of the barium titanate powder to the ferroelectric polymer powder was 95:5.

Example 9

The separator was prepared in a similar manner to that of Example 1, except that the weight ratio of the barium titanate powder to the ferroelectric polymer powder was 85:15.

Example 10

The separator was prepared in a similar manner to that of Example 1, except that the weight ratio of the barium titanate powder to the ferroelectric polymer powder was 80:20.

Example 11

The separator was prepared in a similar manner to that of Example 1, except that the weight ratio of the barium titanate powder to the ferroelectric polymer powder was 75:25.

Example 12

The separator was prepared in a similar manner to that of Example 1, except that the volume distribution particle size Dv50 of the barium titanate powder was 5 μm.

Example 13

The separator was prepared in a similar manner to that of Example 1, except that the volume distribution particle size Dv50 of the barium titanate powder was 3 μm.

Example 14

The separator was prepared in a similar manner to that of Example 1, except that the volume distribution particle size Dv50 of the barium titanate powder was 1 μm.

Example 15

The separator was prepared in a similar manner to that of Example 1, except that the volume distribution particle size Dv50 of the barium titanate powder was 0.5 μm.

Example 16

The separator was prepared in a similar manner to that of Example 1, except that the volume distribution particle size Dv50 of the barium titanate powder was 0.1 μm.

Example 17

The separator was prepared in a similar manner to that of Example 1, except that the volume distribution particle size Dv50 of the barium titanate powder was 0.05 μm.

Example 18

The separator was prepared in a similar manner to that of Example 1, except that the thickness of the ferroelectric coating was 1 μm.

Example 19

The separator was prepared in a similar manner to that of Example 1, except that the thickness of the ferroelectric coating was 1.5 μm.

Example 20

The separator was prepared in a similar manner to that of Example 1, except that the thickness of the ferroelectric coating was 3.5 μm.

Examples 21-26

The separator was prepared in a similar manner to that of Example 1, except that the type of the inorganic ferroelectric or the ferroelectric polymer in the ferroelectric coating was different. Specific parameters are shown in Table 2.

The inorganic ferroelectrics and the ferroelectric polymer materials used in the above examples and comparative examples are commercially available.

Performance Testing (1) Puncture Strength Test of Separator

The puncture strength of the separator was tested according to GB/T36363-2018.

The separator was cut into samples with a width of 10 mm and a length of 150 mm and then laid flat in a fixture and securely clamped. The puncture test was performed using a steel needle at a rate of 100 mm/min. After the test, the sample was removed, the thicknesses at four points around the puncture hole was measured according to GB/T6672-2001, and then the puncture strength was calculated by averaging the thickness values. The diameter of the steel needle might be 1 mm, the radius of the spherical top might be 0.5 mm, and the surface of the steel needle was smooth and free of rust, oxide layer, and oil stain. During the test, the number of separator samples might be no less than 6, and the test results were averaged.

(2) Tensile Strength Test of Separator

The separator was tested for tensile strength in the transverse direction (TD) and machine direction (MD) according to GB/T36363-2018.

The separator was cut into samples with a width of 10 mm and a length of 150 mm (the length direction was parallel to the transverse direction of the separator) and tested to obtain the tensile strength in the TD of the separator. The testing instrument might be a universal testing machine, and the stretching rate might be 50 mm/min. During the test, the number of separator samples might be no less than 6, and the test results were averaged.

The separator was cut into samples with a width of 10 mm and a length of 150 mm (the length direction was parallel to the machine direction of the separator) and tested to obtain the tensile strength in the TD of the separator. The testing instrument might be a universal testing machine, and the stretching rate might be 50 mm/min. During the test, the number of separator samples might be no less than 6, and the test results were averaged.

(3) Thermal Shrinkage Test of Separator

The separator was tested for thermal shrinkage in the transverse direction (TD) and machine direction (MD) according to GB/T36363-2018.

The separator sample had a width of 50 mm and a length of 100 mm, the temperature of the thermal treatment chamber was 105° C., and the time for thermal treatment was 60 min. After the thermal treatment, the length and width of the separator were measured and recorded as a and b, respectively.

Machine direction (MD) thermal shrinkage=[(100−a)/100]×100%, and transverse direction (TD) thermal shrinkage=[(50−b)/50]×100%. During the test, the number of separator samples might be no less than 6, and the test results were averaged.

(4) Air Permeability Test of Separator

The air permeability of the separator was tested according to GB/T36363-2018.

The time required for 100 mL of air to pass through the separator is the air permeability of the separator. A greater air permeability value of the separator indicates a poorer breathability of the separator. During the test, the number of separator samples might be no less than 6, and the test results were averaged. The testing instrument might be an Oken type air-permeability tester (Kumagai Riki Kogyo, KRK).

(5) Dielectric Constant $\varepsilon_r$ Test of Ferroelectric Material Powder

At 25° C., an appropriate amount of ferroelectric material powder was sandwiched between aluminum foils and then the resulting object was placed in a mold and pressed into a disc using a powder tablet press under a pressure of 2 Mpa and a holding time of 2 min. After the pressing, the sample disc was removed and tested for dielectric constant $\varepsilon_r$ using a precision digital LCR meter across a frequency range of 20 Hz to 2 MHz. During the test, the number of samples might be no less than 6, and the test results were averaged.

Next, the above separators were each assembled into a button battery, and then the rate capability was tested.

The button battery might be prepared as follows.

Lithium iron phosphate, the conductive agent carbon black (Super P), and the binder polyvinylidene fluoride (PVDF) were uniformly mixed in an appropriate amount of the solvent N-methylpyrrolidone (NMP) at a weight ratio of 8:1:1 to obtain a positive electrode slurry; the positive electrode slurry was applied on a positive electrode current collector aluminum foil, and after drying, a positive electrode plate was obtained. In a glove box under an argon atmosphere, the positive electrode plate, the separator, and the lithium plate were assembled into a CR2430 button battery. The electrolyte salt of the electrolytic solution was LiFSI with a concentration of 1 mol/L, and the solvent of the electrolytic solution was ethylene glycol dimethyl ether.

The ferroelectric coatings of the separators of Examples 1-26 and Comparative Examples 1-3 all faced the lithium plate.

At 25° C., the button battery was charged at a constant current of 0.1C to 3.65 V and then charged at a constant voltage of 3.65 V to 0.05C; after being left to stand for 10 min, the button battery was discharged at a constant current of 0.1C to 2.5 V. After the button battery was subjected to two cycles according to the above method, the following cycle performance test was performed.

The button battery was charged to 3.65 V at a constant current with a rate capability of 0.5C, 1C, and 2C, and then charged at a constant voltage of 3.65 V to 0.05C; after being left to stand for 10 min, the button battery was discharged at a constant current of 0.2C to 2.5 V. The button battery was subjected to 100 cycles according to the above method to obtain the charge capacity of the 100th cycle and the discharge capacity of the 100th cycle. Coulombic efficiency after 100 cycles of button battery=discharge capacity of the 100th cycle/charge capacity of the 100th cycle.

During the test, the number of button battery samples might be no less than 6, and the test results were averaged.

The test results are shown in Table 3.

TABLE 1A

| | | Ferroelectric material | | | | | | | | | |
|---|---|---|---|---|---|---|---|---|---|---|---|
| | Inorganic ferroelectric | | | | Ferroelectric polymer | | | | | | |
| No. | Type | Dielectric constant $\varepsilon_r$ | Dv50 (μm) | Content | Type | β phase content | Crystallinity | Dielectric constant $\varepsilon_r$ | Melting temperature (° C.) | Weight-average molecular weight | Content |
| Example 1 | $BaTiO_3$ | 5460 | 0.3 | 90% | PVDF | 90% | 65% | 9.6 | 150 | 540,000 | 10% |
| Example 2 | $BaTiO_3$ | 5460 | 0.3 | 90% | PVDF | 95% | 68% | 9.6 | 152 | 550,000 | 10% |
| Example 3 | $BaTiO_3$ | 5460 | 0.3 | 90% | PVDF | 80% | 59% | 9.6 | 148 | 530,000 | 10% |
| Example 4 | $BaTiO_3$ | 5460 | 0.3 | 90% | PVDF | 70% | 56% | 9.6 | 145 | 530,000 | 10% |
| Example 5 | $BaTiO_3$ | 5460 | 0.3 | 90% | PVDF | 60% | 52% | 9.6 | 143 | 520,000 | 10% |
| Comparative Example 1 | / | / | / | / | / | / | / | / | / | / | / |
| Comparative Example 2 | $BaTiO_3$ | 5460 | 0.3 | 90% | α-phase PVDF | | 48% | 0.2 | 152 | 450,000 | 10% |
| Comparative Example 3 | $BaTiO_3$ | 5460 | 0.3 | 90% | PVDF | 30% | 52% | 3.5 | 149 | 470,000 | 10% |

TABLE 1B / TABLE 1B-continued

| | Separator | |
|---|---|---|
| No. | Thickness of ferroelectric coating (μm) | Total thickness (μm) |
| Example 1 | 3 | 12 |
| Example 2 | 3 | 12 |
| Example 3 | 3 | 12 |
| Example 4 | 3 | 12 |
| Example 5 | 3 | 12 |
| Comparative Example 1 | 3 | 12 |
| Comparative Example 2 | 3 | 12 |
| Comparative Example 3 | 3 | 12 |

TABLE 2

| | | Ferroelectric material | | | | | | | | | |
|---|---|---|---|---|---|---|---|---|---|---|---|
| | Inorganic ferroelectric | | | | Ferroelectric polymer | | | | | | |
| No. | Type | Dielectric constant $\varepsilon_r$ | Dv50 (μm) | Content | Type | β phase content | Crystallinity | Dielectric constant $\varepsilon_r$ | Melting temperature (° C.) | Weight-average molecular weight | Content |
| Example 21 | $Cd_2Nb_2O_7$ | 2080 | 0.3 | 90% | PVDF | 90% | 65% | 9.6 | 150 | 540,000 | 10% |
| Example 22 | $PbNb_2O_6$ | 450 | 0.3 | 90% | PVDF | 90% | 65% | 9.6 | 150 | 540,000 | 10% |
| Example 23 | $Bi_4Ti_3O_{12}$ | 200 | 0.3 | 90% | PVDF | 90% | 65% | 9.6 | 150 | 540,000 | 10% |
| Example 24 | $BaTiO_3$ | 5460 | 0.3 | 90% | P(VDF-TrFE) | 90% | 45% | 15.2 | 160 | 500,000 | 10% |
| Example 25 | $BaTiO_3$ | 5460 | 0.3 | 90% | P(VDF-TrFE-CFE) | 90% | 52% | 16.7 | 165 | 560,000 | 10% |
| Example 26 | $BaTiO_3$ | 5460 | 0.3 | 90% | P(VDF-TrFE-CFE-FA) | 90% | 50% | 20.5 | 158 | 600,000 | 10% |

TABLE 3A

| | Performance of separator | | | | | | |
|---|---|---|---|---|---|---|---|
| | Puncture strength (gf) | Tensile strength (kgf/μm) | | Thermal shrinkage (%) | | Air permeability (s/100 mL) | Dielectric constant $\varepsilon_r$ of ferroelectric material |
| No. | | TD direction | MD direction | TD direction | MD direction | | |
| Example 1 | 331 | 1185 | 1365 | 1.85 | 1.74 | 151.2 | 14,872 |
| Example 2 | 341 | 1208 | 1408 | 1.65 | 1.25 | 149.0 | 14230 |
| Example 3 | 322 | 1163 | 1307 | 2.06 | 2.24 | 155.2 | 13201 |

TABLE 3A-continued

| | Performance of separator | | | | | | |
|---|---|---|---|---|---|---|---|
| | Puncture | Tensile strength (kgf/μm) | | Thermal shrinkage (%) | | Air | Dielectric constant $\varepsilon_r$ of |
| No. | strength (gf) | TD direction | MD direction | TD direction | MD direction | permeability (s/100 mL) | ferroelectric material |
| Example 4 | 315 | 1097 | 1250 | 2.52 | 2.53 | 158.9 | 11386 |
| Example 5 | 302 | 1059 | 1202 | 2.60 | 2.89 | 160.2 | 10,423 |
| Comparative Example 1 | 325 | 1204 | 1237 | 1.63 | 1.72 | 152.7 | 0.25 |
| Comparative Example 2 | 315 | 1103 | 1097 | 1.97 | 1.89 | 165.6 | 1836 |
| Comparative Example 3 | 316 | 1224 | 1242 | 1.65 | 1.68 | 151.2 | 3271 |
| Example 6 | 394 | 1025 | 1250 | 1.33 | 1.24 | 150.0 | 10,029 |
| Example 7 | 392 | 1027 | 1258 | 1.44 | 1.45 | 150.2 | 13,243 |
| Example 8 | 368 | 1145 | 1310 | 1.71 | 1.68 | 150.8 | 13,821 |
| Example 9 | 317 | 1252 | 1427 | 2.07 | 2.11 | 154.2 | 14,078 |
| Example 10 | 309 | 1303 | 1477 | 2.18 | 2.46 | 155.1 | 11023 |
| Example 11 | 300 | 1419 | 1505 | 2.52 | 2.73 | 157.7 | 9202 |
| Example 12 | 373 | 1012 | 1167 | 2.89 | 3.29 | 138.2 | 12,491 |
| Example 13 | 347 | 1094 | 1206 | 2.43 | 2.98 | 140.8 | 13,028 |
| Example 14 | 335 | 1127 | 1279 | 2.03 | 2.43 | 147.2 | 13,670 |
| Example 15 | 334 | 1174 | 1334 | 1.99 | 2.07 | 149.7 | 13,892 |
| Example 16 | 322 | 1268 | 1403 | 1.72 | 1.64 | 152.0 | 14,898 |
| Example 17 | 319 | 1304 | 1422 | 1.37 | 1.42 | 166.9 | 14,564 |
| Example 18 | 296 | 1042 | 1193 | 2.02 | 2.01 | 126.9 | 14,872 |
| Example 19 | 303 | 1079 | 1206 | 1.99 | 1.87 | 143.6 | 14,872 |
| Example 20 | 354 | 1223 | 1408 | 1.72 | 1.27 | 178.5 | 14,872 |
| Example 21 | 331 | 1120 | 1259 | 1.77 | 1.58 | 147.2 | 7903 |
| Example 22 | 327 | 1151 | 1226 | 1.92 | 1.38 | 149.8 | 2590 |
| Example 23 | 335 | 1285 | 1380 | 1.46 | 1.49 | 153.5 | 950 |
| Example 24 | 332 | 1132 | 1255 | 1.67 | 1.49 | 146.2 | 14,898 |
| Example 25 | 325 | 1162 | 1223 | 1.78 | 1.53 | 149.4 | 14,920 |
| Example 26 | 337 | 1263 | 1347 | 1.58 | 1.59 | 152.5 | 15,022 |

TABLE 3B

| | Battery performance Coulombic efficiency (%) | | |
|---|---|---|---|
| No. | 0.5C/100 cycles | 1C/100 cycles | 2C/100 cycles |
| Example 1 | 99.95 | 98.24 | 96.22 |
| Example 2 | 99.95 | 98.35 | 97.05 |
| Example 3 | 99.92 | 98.08 | 96.14 |
| Example 4 | 99.88 | 97.79 | 95.82 |
| Example 5 | 99.86 | 97.45 | 95.61 |
| Comparative Example 1 | 97.29 | 91.25 | 82.50 |
| Comparative Example 2 | 98.93 | 94.65 | 91.25 |
| Comparative Example 3 | 98.99 | 94.78 | 92.29 |
| Example 6 | 99.89 | 97.89 | 95.75 |
| Example 7 | 99.91 | 97.92 | 95.89 |
| Example 8 | 99.92 | 98.01 | 96.10 |
| Example 9 | 99.91 | 98.09 | 96.10 |
| Example 10 | 99.85 | 97.69 | 95.77 |
| Example 11 | 99.79 | 97.05 | 95.12 |
| Example 12 | 99.89 | 98.01 | 95.94 |
| Example 13 | 99.90 | 98.04 | 95.99 |
| Example 14 | 99.90 | 98.07 | 96.02 |
| Example 15 | 99.94 | 98.19 | 96.18 |
| Example 16 | 99.94 | 98.17 | 96.17 |
| Example 17 | 99.89 | 98.03 | 96.01 |
| Example 18 | 99.84 | 97.68 | 95.79 |
| Example 19 | 99.88 | 98.03 | 95.95 |
| Example 20 | 99.95 | 98.25 | 96.24 |
| Example 21 | 99.80 | 96.25 | 93.65 |
| Example 22 | 98.96 | 95.01 | 92.22 |
| Example 23 | 98.72 | 93.85 | 91.13 |
| Example 24 | 99.95 | 98.25 | 96.27 |

TABLE 3B-continued

| | Battery performance Coulombic efficiency (%) | | |
|---|---|---|---|
| No. | 0.5C/100 cycles | 1C/100 cycles | 2C/100 cycles |
| Example 25 | 99.95 | 98.34 | 96.32 |
| Example 26 | 99.95 | 98.35 | 96.39 |

Figure 10:
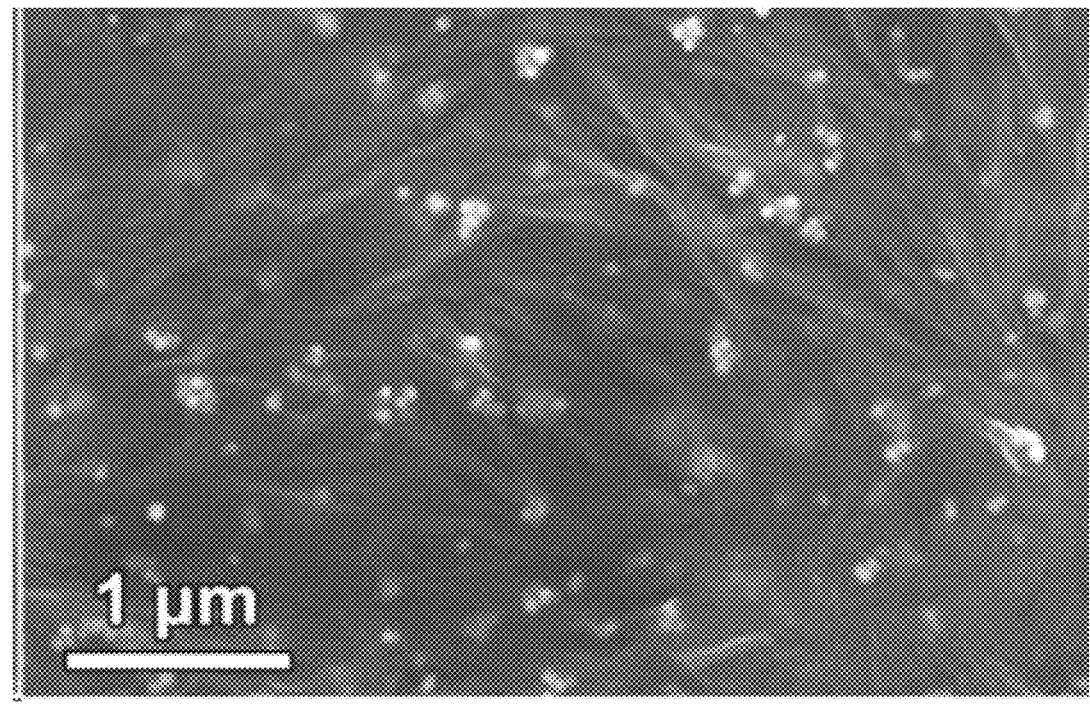
FIG. 10 is a scanning electron microscope (SEM) image of the separator prepared in Example 1.

From the test results of Examples 1-26 and Comparative Examples 1-3, it can be seen that by allowing the ferroelectric coating of the separator to include an inorganic ferroelectric and a ferroelectric polymer and allowing the content of β-phase polyvinylidene fluoride in the ferroelectric polymer to be greater than or equal to 60%, the coulombic efficiency and rate capability of the battery can be enhanced without affecting the breathability, thermal shrinkage, and mechanical strength of the separator. FIG. 10 is a scanning electron microscope (SEM) image of the separator prepared in Example 1. From FIG. 10, it can be seen that a part of the ferroelectric polymer is dispersed on the surface of the inorganic ferroelectric.

From the test results of Examples 1-5, it can further be seen that by further adjusting the content of the β-phase polyvinylidene fluoride in the ferroelectric polymer, the dielectric constant $\varepsilon_r$ of the ferroelectric material can be further increased, the breathability, the thermal shrinkage, and the mechanical strength of the separator can be further improved, and the coulombic efficiency and the rate capability of the battery can be further enhanced.

From the test results of Examples 6-11, it can further be seen that by further adjusting the weight ratio of the inorganic ferroelectric to the ferroelectric polymer, the dielectric constant $\varepsilon_r$ of the ferroelectric material can be further increased, the breathability, the thermal shrinkage, and the mechanical strength of the separator can be further improved, and the coulombic efficiency and the rate capability of the battery can be further enhanced.

From the test results of Examples 12-17, it can further be seen that by further adjusting the particle size of the inorganic ferroelectric, the dielectric constant $\varepsilon_r$ of the ferroelectric material can be further increased, the breathability, the thermal shrinkage, and the mechanical strength of the separator can be further improved, and the coulombic efficiency and the rate capability of the battery can be further enhanced.

From the test results of Examples 21-26, it can further be seen that the dielectric constant $\varepsilon_r$ of the ferroelectric material varies depending on the type of the inorganic ferroelectric and/or the ferroelectric polymer, and the effect in improving the coulombic efficiency and the rate capability of the battery thus also varies.

It should be noted that the present application is not limited to the embodiments described above. The embodiments described above are merely examples, and any embodiments having a structure substantially identical to the technical concept and exerting the same functional effects within the scope of the technical solutions of the present application are all included within the technical scope of the present application. Furthermore, without departing from the spirit of the present application, various modifications that can be conceived by those skilled in the art to the embodiments, as well as other embodiments formed by combining some of the constituent elements of the embodiments, are also included within the scope of the present application.

What is claimed is:

1. A separator, comprising a porous substrate and a ferroelectric coating located on at least one surface of the porous substrate, wherein the ferroelectric coating comprises a ferroelectric material, a dispersant, and a thickener, and the ferroelectric material comprises an inorganic ferroelectric and a ferroelectric polymer, wherein the ferroelectric polymer comprises polyvinylidene fluoride and a copolymer thereof, the ferroelectric polymer comprises β-phase polyvinylidene fluoride, and a content of the β-phase polyvinylidene fluoride in the ferroelectric polymer is greater than or equal to 60%, the dispersant comprises one or more of hydrolyzed polymaleic anhydride, polyacrylic acid, an acrylic block copolymer, a polyester block copolymer, a polyethylene glycol polyol, polyethyleneimine, and respective derivatives thereof, the thickener comprises one or more of sodium hydroxymethylcellulose, methyl cellulose, hydroxyethyl cellulose, hydroxypropyl methyl cellulose, polyacrylate, polyurethane, and polyether, a weight content of the inorganic ferroelectric in the ferroelectric material is 80%-99%, a weight content of the ferroelectric polymer in the ferroelectric material is 1%-20%, a dielectric constant Er of the ferroelectric material is 950 to 15022, a dielectric constant Er of the inorganic ferroelectric is 200-8000, a dielectric constant Er of the ferroelectric polymer is 5-100.

2. The separator according to claim 1, wherein the content of the β-phase polyvinylidene fluoride in the ferroelectric polymer is greater than or equal to 80%.

3. The separator according to claim 1, wherein the dielectric constant $\varepsilon_r$ of the inorganic ferroelectric is 2000-6000;

the dielectric constant $\varepsilon_r$ of the ferroelectric polymer is 8-70.

4. The separator according to claim 1, wherein at least a part of the ferroelectric polymer is located on at least a part of a surface of the inorganic ferroelectric.

5. The separator according to claim 1, wherein a weight content of the inorganic ferroelectric in the ferroelectric material is 85%-95%;

a weight content of the ferroelectric polymer in the ferroelectric material is 5%-15%.

6. The separator according to claim 1, wherein the ferroelectric polymer satisfies at least one of the following conditions (1) to (5):

(1) a Curie temperature of the ferroelectric polymer is 150° C. to 250° C.;

(2) a remanent polarization of the ferroelectric polymer is 10 mC/m² to 1000 mC/m²;

(3) a weight-average molecular weight of the ferroelectric polymer is 200,000 to 800,000;

(4) a melting temperature of the ferroelectric polymer is 140° C. to 220° C.; and (5) a crystallinity of the ferroelectric polymer is greater than or equal to 45%.

7. The separator according to claim 1, wherein a Curie temperature of the inorganic ferroelectric is 110° C. to 150° C.

8. The separator according to claim 1, wherein the ferroelectric polymer comprises one or more of polyvinylidene fluoride and copolymers of a vinylidene fluoride monomer with other monomers;

the other monomers comprise one or more of trifluoroethylene, chlorotrifluoroethylene, fluorinated acetylene, and hexafluoropropylene.

9. The separator according to claim 1, wherein the inorganic ferroelectric comprises one or more of a perovskite type, a tungsten bronze type, a bismuth layer type, a pyrochlore type, a niobate type, and lead barium lithium niobate.

10. The separator according to claim 1, wherein a volume distribution particle size Dv50 of the inorganic ferroelectric is 0.05 μm to 5 μm;

a volume distribution particle size Dv50 of the ferroelectric polymer is 10 nm to 150 nm.

11. The separator according to claim 1, wherein a thickness of the ferroelectric coating is 1 μm to 3.5 μm;

an areal density of the ferroelectric coating is 2.5 g/m² to 15 g/m².

12. The separator according to claim 1, wherein the ferroelectric coating further comprises a dispersant and/or a thickener;

a ratio of a total weight of the ferroelectric material to a weight of the dispersant is 1:(0.01-0.02);

a ratio of the total weight of the ferroelectric material to a weight of the thickener is 1:(0.01-0.02).

13. The separator according to claim 1, wherein the ferroelectric coating is located on one of surfaces of the porous substrate, and a ceramic coating is disposed on the other surface of the porous substrate; when applied to a battery, the ferroelectric coating faces a negative electrode and the ceramic coating faces a positive electrode.

14. The separator according to claim 1, wherein a thickness of the porous substrate is 4 μm to 15 μm;

the porous substrate comprises one or more of polyolefin, halogenated polyolefin, polyamide, polyester, and respective derivatives thereof.

15. The separator according to claim 1, wherein, the inorganic ferroelectric is one or more selected from $Cd_2Nb_2O_7$ and $PbNb_2O_6$.

16. The separator according to claim 15, wherein, the inorganic ferroelectric is $Cd_2Nb_2O_7$.

17. The separator according to claim 15, wherein, the inorganic ferroelectric is $PbNb_2O_6$.

18. A battery cell, comprising the separator according to claim 1.

19. A battery, comprising the battery cell according to claim 18.

20. An electric device, comprising the battery according to claim 19.

\* \* \* \* \*